(12) United States Patent
Hashimoto et al.

(10) Patent No.: US 12,738,481 B2
(45) Date of Patent: Sep. 15, 2026

(54) COATED ACTIVE MATERIAL, ELECTRODE MATERIAL, AND BATTERY

(71) Applicant: Panasonic Intellectual Property Management Co., Ltd., Osaka (JP)

(72) Inventors: Kazuya Hashimoto, Aichi (JP); Yuta Sugimoto, Hyogo (JP); Izuru Sasaki, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 483 days.

(21) Appl. No.: 18/508,182

(22) Filed: Nov. 13, 2023

(65) Prior Publication Data

US 2024/0079571 A1 Mar. 7, 2024

Related U.S. Application Data

(63) Continuation of application No. PCT/JP2022/011263, filed on Mar. 14, 2022.

(30) Foreign Application Priority Data

May 31, 2021 (JP) ................................ 2021-091714

(51) Int. Cl.

| | |
|---|---|
| ***H01M 4/36*** | (2006.01) |
| ***H01M 4/525*** | (2010.01) |
| ***H01M 4/62*** | (2006.01) |
| ***H01M 10/0562*** | (2010.01) |
| *H01M 4/02* | (2006.01) |

(52) U.S. Cl.
CPC ........... *H01M 4/366* (2013.01); *H01M 4/525* (2013.01); *H01M 4/62* (2013.01); *H01M 10/0562* (2013.01); *H01M 2004/028* (2013.01); *H01M 2300/008* (2013.01)

(58) Field of Classification Search
CPC ........ H01M 4/36; H01M 4/366; H01M 4/525; H01M 4/62; H01M 10/0562
USPC ........................................................ 429/323
See application file for complete search history.

(56) References Cited

U.S. PATENT DOCUMENTS

2019/0088995 A1 3/2019 Asano et al.

FOREIGN PATENT DOCUMENTS

WO 2018/025582 2/2018

OTHER PUBLICATIONS

International Search Report of PCT application No. PCT/JP2022/011263 dated May 17, 2022.
Masahiro Tatsumisago et al., "All-solid-state lithium secondary batteries using sulfide-based glass-ceramic electrolytes", Journal of Power Sources 159(2006), May 24, 2006, pp. 193-199.

*Primary Examiner* — Kevin P Kerns
(74) *Attorney, Agent, or Firm* — Rimon P.C.

(57) ABSTRACT

A coated active material includes an active material and a coating layer coating at least a part of the surface of the active material. The coating layer includes a first coating material. The coated active material has a supernatant NV rate of less than 23%, where the supernatant NV rate is a ratio of the NV value of a supernatant liquid to the mass content ratio of the first coating material in a dispersing liquid obtained by dispersing the coated active material in a solvent, and the NV value of the supernatant liquid is a ratio of the mass of a non-volatile component to the mass of the supernatant liquid obtained by precipitating the coated active material by leaving the dispersing liquid to stand.

15 Claims, 3 Drawing Sheets

COATED ACTIVE MATERIAL, ELECTRODE MATERIAL, AND BATTERY

BACKGROUND

1. Technical Field

The present disclosure relates to a coated active material, an electrode material, and a battery.

2. Description of the Related Art

International Publication No. WO 2018/025582 discloses a battery using a halide as a solid electrolyte. Journal of Power Sources, 159 (2006), pp. 193-199 discloses a battery using a sulfide as a solid electrolyte.

SUMMARY

In existing technologies, it is desired to reduce the interface resistance of a battery.

In one general aspect, the techniques disclosed here feature a coated active material including an active material and a coating layer coating at least a part of the surface of the active material. The coating layer contains a first coating material; and the coated active material has a supernatant NV rate of less than 23%, where the supernatant NV rate is a ratio of the NV value of a supernatant liquid to the mass content ratio of the first coating material in a dispersing liquid obtained by dispersing the coated active material in a solvent, and the NV value of the supernatant liquid is a ratio of the mass of a non-volatile component to the mass of the supernatant liquid obtained by precipitating the coated active material by leaving the dispersing liquid to stand.

According to the present disclosure, the interface resistance of a battery can be reduced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
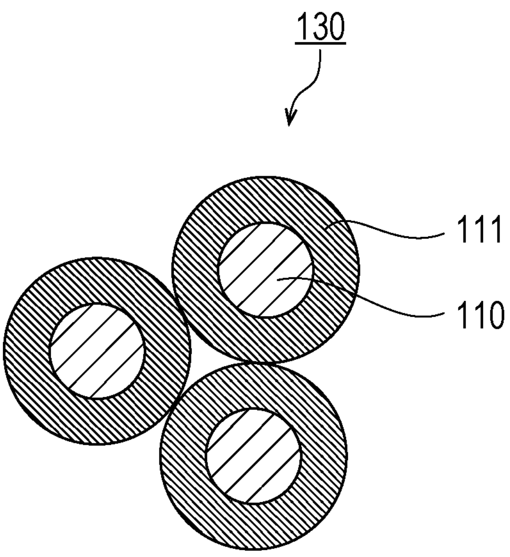
FIG. 1 is a cross-sectional view illustrating a schematic structure of a coated active material in Embodiment 1.

Underlying Knowledge Forming Basis of the Present Disclosure

For example, when a positive electrode active material and a sulfide solid electrolyte are in contact with each other, the sulfide solid electrolyte is oxidatively decomposed during charging of the battery in some cases. In order to solve this problem, the surface of the active material is coated by a material that is excellent in oxidation stability, such as an oxide solid electrolyte.

Here, the present inventors noticed that even if the materials coating active materials are the same, a big difference in the characteristics of the battery, in particular, the interface resistance, is caused. The present inventors further found that this difference is involved in the amount of residue that occurs when the active material is coated by a coating material and arrived at the present disclosure.

Summary of Aspects of the Present Disclosure

The coated active material according to a 1st aspect of the present disclosure is a coated active material that includes:

an active material; and a coating layer coating at least a part of the surface of the active material, wherein the coating layer contains a first coating material, and the coated active material has a supernatant NV rate of less than 23%, wherein the supernatant NV rate is a ratio of the NV value of a supernatant liquid to the mass content ratio of the first coating material in a dispersing liquid obtained by dispersing the coated active material in a solvent, and the NV value of the supernatant liquid is a ratio of the mass of the non-volatile component to the mass of the supernatant liquid obtained by precipitating the coated active material by leaving the dispersing liquid to stand.

According to the 1st aspect, the interface resistance of a battery can be reduced.

In a 2nd aspect of the present disclosure, for example, in the coated active material according to the 1st aspect, the active material may be a positive electrode active material. A solid electrolyte being inferior in oxidation resistance but having high ion conductivity can be used in a positive electrode by applying the technology of the present disclosure to the positive electrode active material.

In a 3rd aspect of the present disclosure, for example, in the coated active material according to the 1st or 2nd aspect, the supernatant NV rate may be less than or equal to 16%. According to such a configuration, the interface resistance of a battery can be further reduced.

In a 4th aspect of the present disclosure, for example, in the coated active material according to any one of the 1st to 3rd aspects, the supernatant NV rate may be less than or equal to 15%. According to such a configuration, the interface resistance of a battery can be further reduced.

In a 5th aspect of the present disclosure, for example, in the coated active material according to any one of the 1st to 4th aspects, the supernatant NV rate may be less than or equal to 8%. According to such a configuration, the interface resistance of a battery can be further reduced.

In a 6th aspect of the present disclosure, for example, in the coated active material according to any one of the 1st to 5th aspects, the first coating material may include Li, M1, and X1, where M1 may be at least one selected from the group consisting of metal elements excluding Li and metalloid elements; and X1 may be at least one selected from the group consisting of F, Cl, Br, and I. Such a material is excellent in ion conductivity and oxidation resistance.

In a 7th aspect of the present disclosure, for example, in the coated active material according to the 6th aspect, the first coating material may be represented by the following Formula (1):

$$Li_{\alpha 1}M1_{\beta 1}Al_{\gamma 1} \quad (1)$$

where α1, β1, and γ1 may be each independently a value greater than 0. When the halide solid electrolyte represented by Formula (1) is used in a battery, the output property of the battery can be improved.

In an 8th aspect of the present disclosure, for example, in the coated active material according to the 6th or 7th aspect, M1 may include yttrium. When M1 includes Y, the halide solid electrolyte represented by Formula (1) exhibits high ion conductivity.

In a 9th aspect of the present disclosure, for example, in the coated active material according to any one of the 1st to 8th aspects, the coating layer may include a first coating layer containing the first coating material and a second coating layer containing a second coating material. The first coating layer may be located on the outer side of the second coating layer. According to such a configuration, the interface resistance of a battery can be further reduced.

In a 10th aspect of the present disclosure, for example, in the coated active material according to the 9th aspect, the second coating material may include an oxide solid electrolyte having lithium ion conductivity. According to such a configuration, the interface resistance of a battery can be further reduced.

In an 11th aspect of the present disclosure, for example, in the coated active material according to the 9th or 10th aspect, the second coating material may include Nb. According to such a configuration, the interface resistance of a battery can be further reduced.

In a 12th aspect of the present disclosure, for example, in the coated active material according to any one of the 9th to 11th aspects, the second coating material may include lithium niobate. According to such a configuration, the interface resistance of a battery can be further reduced.

An electrode material according to a 13th aspect of the present disclosure includes:

the coated active material according to any one of the 1st to 12th aspects; and a solid electrolyte.

The interface resistance of the battery can be reduced by using the electrode material of the present disclosure.

In a 14th aspect of the present disclosure, for example, in the electrode material according to the 13th aspect, the solid electrolyte may include a sulfide solid electrolyte. Sulfide solid electrolytes have excellent ion conductivity and flexibility. Accordingly, when a sulfide solid electrolyte is used in the electrode material, the interface resistance of a battery is likely to be reduced.

A battery according to a 15th aspect of the present disclosure includes:

a positive electrode including the electrode material of the 13th or 14th aspect;

a negative electrode; and an electrolyte layer disposed between the positive electrode and the negative electrode.

According to the present disclosure, a battery having reduced interface resistance can be provided.

Embodiments of the present disclosure will now be described with reference to the drawings.

Embodiment 1

FIG. 1 is a cross-sectional view illustrating a schematic structure of a coated active material 130 in Embodiment 1. The coated active material 130 includes an active material 110 and a coating layer 111. The shape of the active material 110 is, for example, particulate. The coating layer 111 coats at least a part of the surface of the active material 110. The coating layer 111 prevents the active material 110 and the solid electrolyte from being in direct contact with each other in the electrode of a battery to suppress a side reaction of the solid electrolyte. As a result, the interface resistance of the battery can be reduced.

The coating layer 111 is a layer containing a coating material (first coating material). The coating layer 111 is disposed on the surface of the active material 110. The coating layer 111 may contain only the coating material. "Containing only the coating material" means that materials other than the coating material are not intentionally added except for inevitable impurities. For example, raw materials for the coating material and by-products during the production of the coating material are encompassed in inevitable impurities.

The coating material can be a solid electrolyte having lithium ion conductivity (first solid electrolyte).

The mass ratio of the inevitable impurities to the total mass of the coating layer 111 may be less than or equal to 5%, less than or equal to 3%, less than or equal to 1%, or less than or equal to 0.5%.

The "interface resistance" is a value calculated by the following method. After completion of the battery, charge and discharge treatment is performed. The discharge in the first cycle is stopped at a depth of discharge of 50%. The state at a depth of discharge of 50% is a state when an amount of electric power determined by (charging capacity)×0.93 (average of initial charge and discharge efficiency)×0.50 is discharged from a battery in the charged state. Subsequently, the impedance of the battery is measured. The range of the impedance measurement is, for example, from 10 mHz to 1 MHz. In complex impedance plots, the resistance value is calculated from a circular arc present near a frequency of 1 kHz. The value obtained by multiplying the calculated resistance value by the mass of the active material included in the battery can be recognized as "interface resistance".

The coating layer 111 may uniformly coat the active material 110. The coating layer 111 prevents the active material 110 and the solid electrolyte from being in direct contact with each other in the electrode of a battery to suppress a side reaction of the solid electrolyte. As a result, the interface resistance of the battery can be reduced.

The coating layer 111 may coat only a part of the surface of the active material 110. Since the particles of the active material 110 are in direct contact with each other through the part not coated by the coating layer 111, the electron conductivity between the particles of the active material 110 is improved. As a result, the battery can operate at high output.

The amount of residue included in the powder of the coated active material 130 is small. In the present disclosure, the amount of residue can be prescribed by "supernatant non-volatile (NV) rate". The supernatant NV rate of the coated active material 130 is greater than or equal to 0% and less than 23% when expressed as a percentage. When the supernatant NV rate of the coated active material 130 is greater than or equal to 0% and less than 23%, the battery using the coated active material 130 exhibits low interface resistance. The supernatant NV rate of the coated active material 130 is a value reflecting the amount of residue of the coating material that constitutes the coating layer 111 and also a value reflecting the coating ratio of the active material 110 by the coating layer 111.

When the coating ratio of the active material 110 by the coating material is low and the amount of residue of the coating material is large, the supernatant NV rate of the coated active material 130 is high. In contrast, when the coating ratio of the active material 110 by the coating material is high and the amount of residue of the coating material is small, the supernatant NV rate of the coated active material 130 is low. An ideal coating state is a state in which the contact between the active material 110 and the solid electrolyte is prevented by the coating layer 111 to suppress the oxidative decomposition of the solid electrolyte. As a result, the interface resistance of the battery is reduced.

The main component of the residue is the coating material used when the coating layer 111 is formed. The "main component" means the component contained most in mass ratio. The residue may include a by-product and impurities. The residue does not adhere to the active material 110 when the coating layer 111 is formed and remains in a fine particle shape in the powder of the coated active material 130.

The supernatant NV rate will be then described in detail. The supernatant NV rate is a value determined by the following procedure and calculation. The supernatant NV rate is a ratio of the NV value of a supernatant liquid to the mass content ratio of the coating material in a dispersing liquid obtained by dispersing the coated active material 130 in a solvent. That is, the supernatant NV rate is a value determined by Equation I below. In preparation of the dispersing liquid, a predetermined amount of the coated active material 130 and a predetermined amount of the solvent are used.

$$(\text{Supernatant } NV \text{ rate})=(NV \text{ value of supernatant liquid})/(\text{mass content ratio of coating material in dispersing liquid}) \quad (I).$$

Figure 2A:
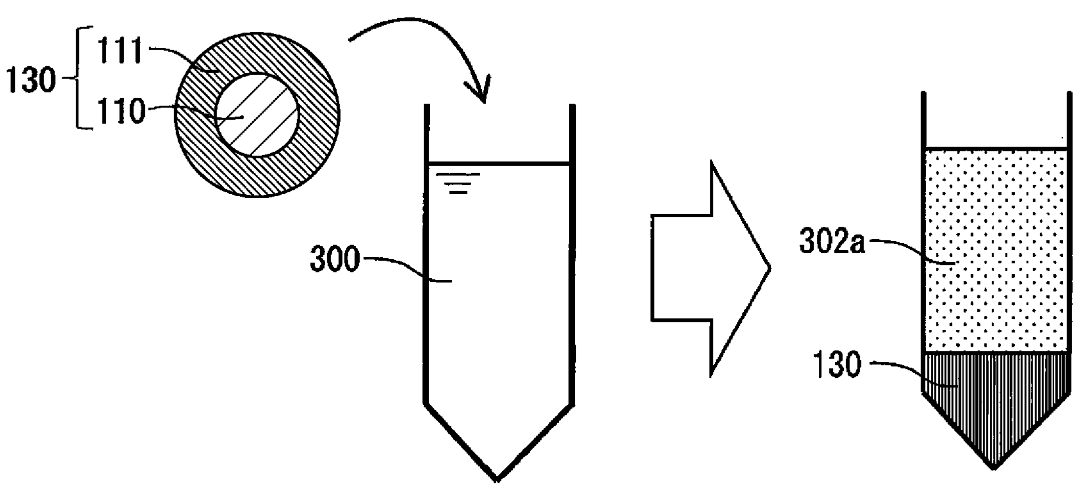
FIG. 2A is a diagram showing preparation of a supernatant liquid.
Figure 2B:
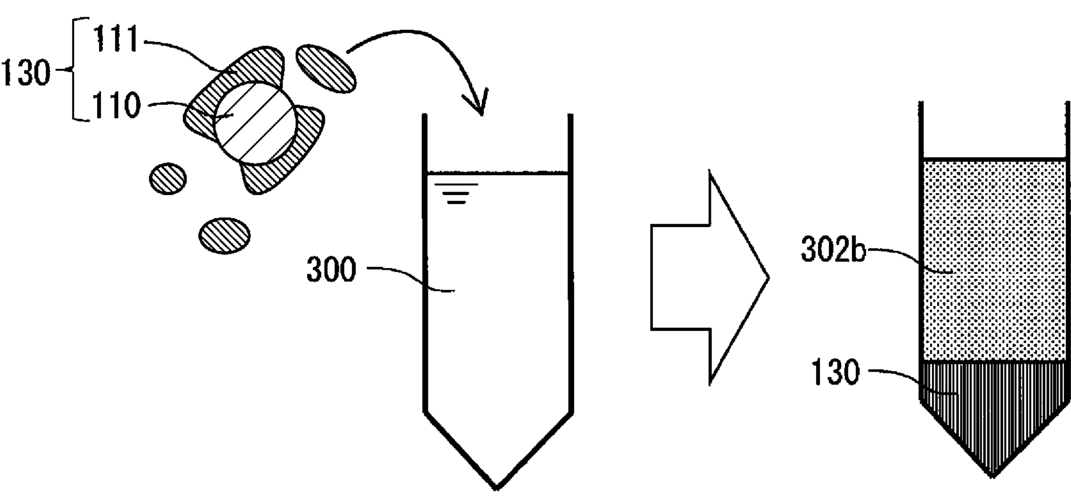
FIG. 2B is another diagram showing preparation of a supernatant liquid.

FIGS. 2A and 2B are diagrams each showing preparation of a supernatant liquid. For the details, FIG. 2A shows a state of the supernatant liquid when the supernatant NV rate value is low. FIG. 2B shows a state of the supernatant liquid when the supernatant NV rate value is high.

As shown in FIG. 2A, first, a dispersing liquid is prepared by dispersing the coated active material 130 in a solvent 300. The solvent 300 can be an organic solvent such as p-chlorotoluene. It is desirable that the coating material is hardly dissolved in the solvent 300 and that the coated active material 130 is easily dispersed in the solvent 300. In other words, it is desirable that the solubility parameter of the coating material and the solubility parameter of the solvent 300 are moderately apart from each other. The dispersing liquid includes, for example, 2 parts by mass of the coated active material 130 and 100 parts by mass of the solvent 300. The mass content ratio of the coating material in the dispersing liquid is calculated by Equation II below. In Equation II, m1 represents the mass (g) of the coated active material 130 included in the dispersing liquid; r1 represents the ratio of the mass of the coating material to the mass of the coated active material 130; and m2 represents the mass (g) of the solvent.

$$(\text{Mass content ratio of coating material in dispersing liquid})=(m1\times r1)/(m1+m2) \quad (II).$$

Secondly, the dispersing liquid is stirred for 1 minute with an ultrasonic homogenizer (for example, manufactured by SMT Corporation, UH-50, 20 kHz). Subsequently, the dispersing liquid is left to stand for 30 minutes to precipitate the coated active material 130. Subsequently, only the supernatant liquid 302*a* is collected. Subsequently, the organic solvent is volatilized from the collected supernatant liquid 302*a*. The supernatant liquid 302*a* may be heated for volatilizing the organic solvent. The heating conditions are, for example, 130° C., a vacuum of about −30 kPa, and 1.5 hours. That is, heating is performed under an atmosphere lower than atmospheric pressure at a temperature lower than the boiling point of the organic solvent for a sufficient time. The mass of residue remaining without volatilizing is then measured. The NV value of the supernatant liquid is calculated based on Equation III below. In Equation III, m3 represents the mass (g) of the collected supernatant liquid; and m4 represents the mass (g) of the residue. The NV value of the supernatant liquid is a ratio of the mass of the non-volatile component to the mass of the supernatant liquid 302*a* obtained by leaving the dispersing liquid to stand to precipitate the coated active material 130. That is, the NV value of the supernatant liquid means the non-volatile value of the supernatant liquid 302*a* obtained from the dispersing liquid of the coated active material 130.

$$(NV \text{ value of supernatant liquid})=m4/m3 \quad (III).$$

The supernatant NV rate is determined by substituting the mass content ratio of the coating material calculated from Equation II and the NV value of the supernatant liquid calculated from Equation III for Equation I.

The supernatant NV rate may be less than or equal to 16%, less than or equal to 15%, or less than or equal to 8%. According to such a configuration, the interface resistance of a battery can be further reduced. The lower limit of the supernatant NV rate is not particularly limited. The lower limit of the supernatant NV rate may be 0%. When it is not practical to decrease the amount of residue to zero, the supernatant NV rate may be greater than 0%. The lower limit of the supernatant NV rate may be 3%.

As shown in FIG. 2A, when the coating ratio of the active material 110 by the coating material is high, that is, when the amount of residue included in the powder of the coated active material 130 is small, the amount of residue included in the supernatant liquid 302*a* is also small. Accordingly, not only the NV value of the supernatant liquid but also the value of the supernatant NV rate are low. In contrast, as shown in FIG. 2B, when the coating ratio of the active material 110 by the coating material is low, that is, when the amount of residue included in the powder of the coated active material 130 is large, the amount of residue included in the supernatant liquid 302*b* is also large. Accordingly, not only the NV value of the supernatant liquid but also the value of the supernatant NV rate are high.

Next, the coating layer 111 and the active material 110 will be described in detail.

Coating Layer 111

A coating material that is excellent in ion conductivity and oxidation resistance is suitable for the coating layer 111. The coating material (first coating material) can be a material including Li, M1, and X1. M1 is at least one selected from the group consisting of metal elements excluding Li and metalloid elements. X1 is at least one selected from the group consisting of F, Cl, Br, and I. Such a material is excellent in ion conductivity and oxidation resistance.

The "metalloid elements" are B, Si, Ge, As, Sb, and Te.

The "metal elements" are all elements in Groups 1 to 12 of the Periodic Table excluding hydrogen and all elements in Groups 13 to 16 excluding B, Si, Ge, As, Sb, Te, C, N, P, O, S, and Se. That is, the metal elements are element groups that can become cations when they form inorganic compounds with halogen compounds.

The coating material is, for example, a halide solid electrolyte. The halide solid electrolyte is a solid electrolyte including a halogen element. The halide solid electrolyte is represented by, for example, the following Formula (1):

$$Li_{\alpha 1}M1_{\beta 1}X1_{\gamma 1} \quad (1)$$

where α1, β1, and γ1 are each independently a value greater than 0.

The halide solid electrolyte represented by Formula (1) has high ion conductivity compared to a halide solid electrolyte consisting of Li and a halogen element only, such as LiI. Accordingly, when a halide solid electrolyte represented by Formula (1) is used in a battery, the output property of the battery can be improved.

In the present disclosure, when the elements in a formula are denoted as "(Al,Ga,In)", this notation indicates at least one element selected from the parenthesized group of elements. That is, "(Al,Ga,In)" is synonymous with "at least one selected from the group consisting of Al, Ga, and In". The same is applied to other elements.

In Formula (1), M1 may include Y (yttrium). That is, the coating material may include Y as a metal element. When M1 includes Y, the halide solid electrolyte represented by Formula (1) exhibits high ion conductivity.

Formula (1) may satisfy $2.5 \le \alpha 1 \le 3$, $1 \le \beta 1 \le 1.1$, and $\gamma 1 = 6$.

X1 may include at least one selected from the group consisting of Cl and Br. X1 may include Cl and Br.

The halide solid electrolyte may not include sulfur.

The halide solid electrolyte including Y may be a compound represented by the following Formula (2):

$$Li_aMe_bY_cX_6 \quad (2).$$

Formula (2) satisfies a+mb+3c=6 and c>0. In Formula (2), Me includes at least one element selected from the group consisting of metal elements excluding Li and Y and metalloid elements; m represents the valence of Me; and X includes at least one selected from the group consisting of F, Cl, Br, and I.

Me may include at least one selected from the group consisting of Mg, Ca, Sr, Ba, Zn, Sc, Al, Ga, Bi, Zr, Hf, Ti, Sn, Ta, and Nb.

The coating material may be a compound represented by the following Formula (A1):

$$Li_{6-3d}Y_dX_6 \quad (A1)$$

where X is at least one element selected from the group consisting of Cl and Br; and 0<d<2 is satisfied.

The coating material may be a compound represented by the following Formula (A2):

$$Li_3YX_6 \quad (A2)$$

where X is at least one element selected from the group consisting of Cl and Br.

The coating material may be a compound represented by the following Formula (A3):

$$Li_{3-3\delta}Y_{1+\delta}Cl_6 \quad (A3)$$

where $0<\delta\le 0.15$ is satisfied.

The coating material may be a compound represented by the following Formula (A4):

$$Li_{3-3\delta}Y_{1+\delta}Br_6 \quad (A4)$$

where $0<\delta\le 0.25$ is satisfied.

The coating material may be a compound represented by the following Formula (A5):

$$Li_{3-3\delta+a}Y_{1+\delta-a}Me_aCl_{6-x}Br_x \quad (A5)$$

where Me is at least one element selected from the group consisting of Mg, Ca, Sr, Ba, and Zn; and $-1<\delta<2$, $0<a<3$, $0<(3+3\delta+a)$, $0<(1+\delta-a)$, and $0\le x\le 6$ are satisfied.

The coating material may be a compound represented by the following Formula (A6):

$$Li_{3-3\delta}Y_{1+\delta-a}Me_aCl_{6-x}Br_x \quad (A6)$$

where Me is at least one element selected from the group consisting of Al, Sc, Ga, and Bi; and $-1<\delta<1$, $0<a<2$, $0<(1+\delta-a)$, and $0\le x\le 6$ are satisfied.

The coating material may be a compound represented by the following Formula (A7):

$$Li_{3-3\delta-a}Y_{1+\delta-a}Me_aCl_{6-x}Br_x \quad (A7)$$

where Me is at least one element selected from the group consisting of Zr, Hf, and Ti; and $-1<\delta<1$, $0<a<1.5$, $0<(3-3\delta-a)$, $0<(1+\delta-a)$, and $0\le x\le 6$ are satisfied.

The coating material may be a compound represented by the following Formula (A8):

$$Li_{3-3\delta-2a}Y_{1+\delta-a}Me_aCl_{6-x}Br_x \quad (A8)$$

where Me is at least one element selected from the group consisting of Ta and Nb; and $-1<\delta<1$, $0<a<1.2$, $0<(3-3\delta-2a)$, $0<(1+\delta-a)$, and $0\le x\le 6$ are satisfied.

As the coating material, for example, $Li_3YX_6$, $Li_2MgX_4$, $Li_2FeX_4$, $Li(Al,Ga,In)X_4$, or $Li_3(Al,Ga,In)X_6$ can be used. Here, X includes at least one element selected from the group consisting of Cl and Br.

A typical composition of $Li_3YX_6$ is, for example, $Li_3YBr_2Cl_4$. The coating material may include $Li_3YBr_2Cl_4$. The coating material may be $Li_{2.7}Y_{1.1}Cl_6$, $Li_3YBr_6$, or $Li_{2.5}Y_{0.5}Zr_{0.5}Cl_6$.

The thickness of the coating layer 111 is, for example, greater than or equal to 1 nm and less than or equal to 500 nm. When the thickness of the coating layer 111 is appropriately adjusted, the contact between the active material 110 and the solid electrolyte 100 can be sufficiently prevented. The thickness of the coating layer 111 can be specified by slicing the coated active material 130 by a method such as ion milling and observing a cross section of the coated active material 130 with a transmission electron microscope. The average value of thicknesses measured at multiple arbitrary positions (for example, 5 points) can be recognized as the thickness of the coating layer 111.

The coating material can be manufactured by the following method.

Raw material powders of halides are provided so as to give the compounding ratio of a target composition. For example, when $Li_3YCl_6$ is produced, LiCl and $YCl_3$ are provided at a molar ratio of 3:1.

On this occasion, M1, Me, X, and X1 in the above-described formulae can be determined by appropriately selecting the types of raw material powders. The above-described values: α1, β1, γ1, a, b, c, d, m, δ, and x, can be adjusted by adjusting the raw materials, compounding ratio, and synthesis process.

The raw material powders are thoroughly mixed, and are then mixed, pulverized, and reacted using a method of mechanochemical milling. Alternatively, the raw material powders may be thoroughly mixed and then sintered in vacuum. Consequently, a coating material having a desired composition is obtained.

Active Material 110

The active material 110 is, for example, a positive electrode active material. A solid electrolyte being inferior in oxidation resistance but having high ion conductivity can be used as a positive electrode by applying the technology of the present disclosure to the positive electrode active material. Examples of such solid electrolytes include a sulfide solid electrolyte and a halide solid electrolyte.

The positive electrode active material includes a material that has a property of occluding and releasing metal ions (e.g., lithium ions). As the positive electrode active material, for example, a lithium-containing transition metal oxide, a transition metal fluoride, a polyanionic material, a fluorinated polyanionic material, a transition metal sulfide, a transition metal oxysulfide, and a transition metal oxynitride can be used. In particular, when a lithium-containing transition metal oxide is used as the positive electrode active material, the manufacturing cost of a battery can be reduced, and the average discharge voltage can be increased. Examples of the lithium-containing transition metal oxide include $Li(Ni,Co,Al)O_2$, $Li(Ni,Co,Mn)O_2$, and $LiCoO_2$.

The positive electrode active material may include Ni, Co, and Al. The positive electrode active material may be lithium nickel cobalt aluminum oxide. For example, the positive electrode active material may be $Li(Ni,CO,Al)O_2$. According to such a configuration, the energy density and charge and discharge efficiency of the battery can be more enhanced.

The active material 110 has, for example, a particle shape. The particle shape of the active material 110 is not particularly limited. The particle shape of the active material 110 can be spherical, oval spherical, squamous, or fibrous.

Method for Manufacturing Coated Active Material

The coated active material 130 can be manufactured by the following method.

A powder of the active material 110 and a powder of the coating material are mixed at an appropriate ratio to obtain a mixture. The mixture is subjected to milling treatment and is applied with a mechanical energy. The milling treatment can use a mixer such as a ball mill. In order to suppress the oxidation of a material, the milling treatment may be performed in a dry and inert atmosphere.

The coated active material 130 may be manufactured by a dry particle composing method. The treatment by the dry particle composing method includes application of at least one mechanical energy selected from the group consisting of impact, compression, and shear to the active material 110 and the coating material. The active material 110 and the coating material are mixed at an appropriate ratio.

The apparatus that is used in manufacturing of the coated active material 130 is not particularly limited and can be an apparatus that can apply mechanical energies: impact, compression, and shear, to a mixture of the active material 110 and the coating material. Examples of the apparatus for applying mechanical energies include a ball mill, "Mehanofusion" (manufactured by Hosokawa Micron Corporation) and a compression shear processing apparatus (particle composing apparatus) such as "NOBILTA" (manufactured by Hosokawa Micron Corporation).

"Mehanofusion" is a particle composing apparatus using a dry mechanical composing technology by applying a strong mechanical energy to multiple different raw material powders. Mehanofusion applies mechanical energies of compression, shear, and friction to raw material powders thrown between a rotating container and a press head. Consequently, composing of particles occurs.

"NOBILTA" is a particle composing apparatus using a dry mechanical composing technology which is a particle composing technology developed for composing of nanoparticles as a raw material. NOBILTA manufactures composite particles by applying mechanical energies of impact, compression, and shear to multiple types of raw material powders.

In "NOBILTA", a rotor disposed so as to have a predetermined gap with the inner wall of a horizontally cylindrical mixing vessel rotates at a high speed in the mixing vessel, and treatment of allowing raw material powders to forcibly pass through the gap is repeated multiple times. Consequently, forces of impact, compression, and shear are applied to the mixture, and composite particles of the active material 110 and the coating material can be produced. The thickness of the coating layer 111, the coating ratio of the active material 110 by the coating material, and so on can be controlled by adjusting the conditions such as the rotation speed of the rotor, the treatment time, and the charge-in quantity. That is, the supernatant NV rate described above can also be controlled.

However, treatment with the above apparatus is not essential. The coated active material 130 may be manufactured by mixing the active material 110 and the coating material using a mortar, a mixer, or the like.

MODIFICATION EXAMPLE

Figure 3:
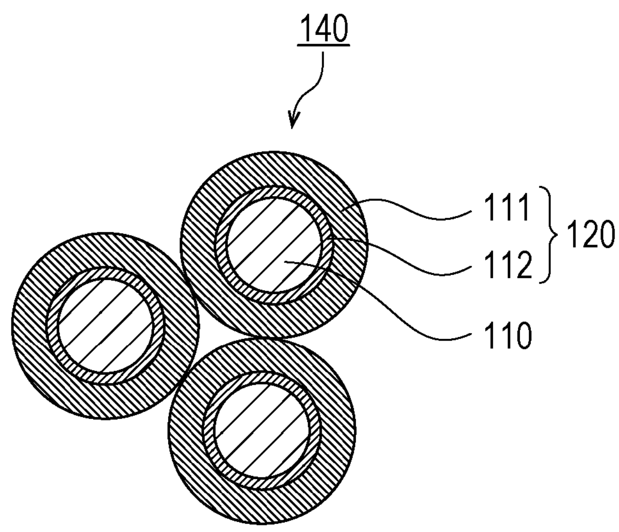
FIG. 3 is a cross-sectional view illustrating a schematic structure of a coated active material in a modification example.

FIG. 3 is a cross-sectional view illustrating a schematic structure of a coated active material 140 in a modification example. The coated active material 140 includes an active material 110 and a coating layer 120. In the modification example, the coating layer 120 includes a first coating layer 111 and a second coating layer 112. The first coating layer 111 is a layer including a first coating material. The second coating layer 112 is a layer including a second coating material. The first coating layer 111 is located on the outer side of the second coating layer 112. According to such a configuration, the interface resistance of a battery can be further reduced.

The first coating layer 111 is the coating layer 111 described in Embodiment 1. The first coating material is the coating material described in Embodiment 1. Examples of the first coating material include a halide solid electrolyte. In one example, the ion conductivity of the first coating material is higher than that of the second coating material.

The second coating layer 112 is located between the first coating layer 111 and the active material 110. In this modification example, the second coating layer 112 is in direct contact with the active material 110. The second coating material contained in the second coating layer 112 can be a material excellent in ion conductivity and oxidation resistance. The second coating material can also be a solid electrolyte (second solid electrolyte) having lithium ion conductivity. The second coating material is typically an oxide solid electrolyte having lithium ion conductivity. According to such a configuration, the interface resistance of a battery can be further reduced.

The second coating material can be a material including Nb. The second coating material typically includes lithium niobate ($LiNbO_3$). According to such a configuration, the interface resistance of a battery can be further reduced. As the oxide solid electrolyte being the second coating material, materials described later can also be used.

The thickness of the first coating layer 111 is, for example, greater than or equal to 1 nm and less than or equal to 500 nm. The thickness of the second coating layer 112 is, for example, greater than or equal to 1 nm and less than or equal to 100 nm. When the thicknesses of the first coating layer 111 and second coating layer 112 are appropriately adjusted, the contact between the active material 110 and the solid electrolyte 100 can be sufficiently prevented. The thickness of each layer can be specified by the method described above.

The coated active material 140 can be manufactured by the following method.

First, a second coating layer 112 is formed on the surface of the active material 110. The method for forming the second coating layer 112 is not particularly limited. Examples of the method for forming the second coating layer 112 include a liquid phase coating method and a gas phase coating method.

For example, in the liquid phase coating method, a precursor solution of the second coating material is applied to the surface of the active material 110. When a second coating layer 112 containing $LiNbO_3$ is formed, the precursor solution can be a mixture solution (sol solution) of a solvent, a lithium alkoxide, and a niobium alkoxide. Examples of the lithium alkoxide include lithium ethoxide. Examples of the niobium alkoxide include niobium ethoxide. The solvent is, for example, an alcohol such as ethanol. The amounts of the lithium alkoxide and the niobium alkoxide are adjusted according to the target composition of the second coating layer 112. Water may be added to the precursor solution as needed. The precursor solution may be acidic or alkaline.

The method for applying the precursor solution to the surface of the active material 110 is not particularly limited. For example, a precursor solution can be applied to the surface of the active material 110 with a tumbling fluidized bed granulating-coating machine. The tumbling fluidized bed granulating-coating machine can apply the precursor solution to the surface of the active material 110 by spraying the precursor solution to the active material 110 while tumbling and fluidizing the active material 110. Consequently, a precursor film is formed on the surface of the active material 110. Subsequently, the active material 110 coated by the precursor film is heat-treated. The gelation of the precursor film proceeds by heat treatment to form the second coating layer 112.

Examples of the gas phase coating method include a pulsed laser deposition (PLD) method, a vacuum vapor deposition method, a sputtering method, a thermal chemical vapor deposition method (CVD) method, and a plasma chemical vapor deposition method. For example, in the PLD method, an ion conductive material as a target is irradiated with a high-energy pulsed laser (e.g., KrF Excimer laser, wavelength: 248 nm) to deposit the sublimated ion conductive material on the surface of the active material 110. When a second coating layer 112 of $LiNbO_3$ is formed, sintered $LiNbO_3$ with a high density is used as the target.

After formation of the second coating layer 112, a first coating layer 111 is formed by the method described in Embodiment 1. Consequently, a coated active material 140 is obtained.

Embodiment 2

Figure 4:
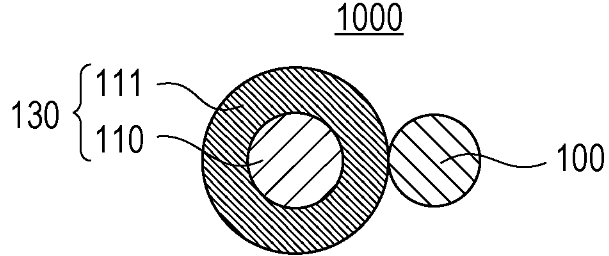
FIG. 4 is a cross-sectional view illustrating a schematic structure of an electrode material in Embodiment 2.

FIG. 4 is a cross-sectional view illustrating a schematic structure of an electrode material 1000 in Embodiment 2.

The electrode material 1000 includes the coated active material 130 and the solid electrolyte 100 in Embodiment 1. According to the solid electrolyte 100, the ion conductivity in the electrode material 1000 can be sufficiently secured. The electrode material 1000 can be a positive electrode material. When the coated active material 130 is a coated negative electrode active material, this embodiment can provide a negative electrode material. The coated active material 140 of the modification example can also be used in place of or together with the coated active material 130.

The active material 110 of the coated active material 130 is isolated from the solid electrolyte 100 by the coating layer 111. The active material 110 need not be in direct contact with the solid electrolyte 100, because the coating layer 111 has ion conductivity.

The solid electrolyte 100 may include at least one selected from the group consisting of a halide solid electrolyte, a sulfide solid electrolyte, an oxide solid electrolyte, a polymeric solid electrolyte, and a complex hydride solid electrolyte.

Examples of the halide solid electrolyte includes the materials described as the coating material in Embodiment 1.

As the sulfide solid electrolyte, for example, $Li_2S—P_2S_5$, $Li_2S—SiS_2$, $Li_2S—B_2S_3$, $Li_2S—GeS_2$, $Li_{3.25}Ge_{0.25}P_{0.75}S_4$, or $Li_{10}GeP_2S_{12}$ can be used. To these sulfide solid electrolytes, LiX, $Li_2O$, $MO_q$, $Li_pMO_q$, or the like may be added. Here, X is at least one selected from the group consisting of F, Cl, Br, and I. Element M in "$MO_q$" and "$Li_pMO_q$" is at least one selected from the group consisting of P, Si, Ge, B, Al, Ga, In, Fe, and Zn; and p and q in "$MO_q$" and "$Li_pMO_q$" are each independently a natural number.

As the oxide solid electrolyte, for example, an NASICON-type solid electrolyte represented by $LiTi_2(PO_4)_3$ or its element substitute, a $(LaLi)TiO_3$-based perovskite-type solid electrolyte, an LISICON-type solid electrolyte represented by $Li_{14}ZnGe_4O_{16}$, $Li_4SiO_4$, $LiGeO_4$, or its element substitute, a garnet-type solid electrolyte represented by $Li_7La_3Zr_2O_{12}$ or its element substitute, $Li_3PO_4$ or its N-substitute, or glass or glass ceramics in which a base material including an Li—B—O compound, such as $LiBO_2$ or $Li_3BO_3$, is doped with $Li_2SO_4$, $Li_2CO_3$ can be used.

As the polymeric solid electrolyte, for example, a compound of a polymeric compound and a lithium salt can be used. The polymeric compound may have an ethylene oxide structure. A polymeric compound having an ethylene oxide structure can contain a large amount of a lithium salt. Accordingly, it is possible to more enhance the ion conductivity. Examples of the lithium salt include $LiPF_6$, $LiBF_4$, $LiSbF_6$, $LiAsF_6$, $LiSO_3CF_3$, $LiN(SO_2F)_2$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these salts may be used alone, or a mixture of two or more lithium salts selected from these salts may be used.

As the complex hydride solid electrolyte, for example, $LiBH_4—LiI$ and $LiBH_4—P_2S_5$ can be used.

The shape of the solid electrolyte 100 is not particularly limited and may be, for example, acicular, spherical, or oval spherical. For example, the shape of the solid electrolyte 100 may be particulate.

When the shape of the solid electrolyte 100 is particulate (e.g., spherical), the median diameter may be less than or equal to 100 μm. When the median diameter is less than or equal to 100 μm, the coated active material 130 and the solid electrolyte 100 can form a good dispersion state in the electrode material 1000. Accordingly, the charge and discharge characteristics of the battery are improved. The median diameter of the solid electrolyte 100 may be less than or equal to 10 μm.

The median diameter of the solid electrolyte 100 may be smaller than that of the coated active material 130. According to such a configuration, the solid electrolyte 100 and the coated active material 130 can form a better dispersion state in the electrode material 1000.

The median diameter of the coated active material 130 may be greater than or equal to 0.1 μm and less than or equal to 100 μm. When the coated active material 130 has a median diameter of greater than or equal to 0.1 μm, the coated active material 130 and the solid electrolyte 100 can form a good dispersion state in the electrode material 1000. As a result, the charge and discharge characteristics of the battery are improved. When the coated active material 130 has a median diameter of less than or equal to 100 μm, the lithium diffusion speed inside the coated active material 130 is sufficiently secured. Accordingly, the battery can operate at high output.

The median diameter of the coated active material 130 may be larger than that of the solid electrolyte 100. Consequently, the coated active material 130 and the solid electrolyte 100 can form a good dispersion state.

In the electrode material 1000, the solid electrolyte 100 and the coated active material 130 may be in contact with each other as shown in FIG. 4. In such a case, the coating layer 111 and the solid electrolyte 100 are in contact with each other.

The electrode material 1000 may include particles of a plurality of solid electrolytes 100 and particles of a plurality of coated active materials 130.

In the electrode material 1000, the content of the solid electrolyte 100 and the content of the coated active material 130 may be the same or different.

In the present specification, the "median diameter" means the particle diameter at which the accumulated volume in a volume-based particle size distribution is equal to 50%. The volume-based particle size distribution is measured with, for example, a laser diffraction measurement apparatus or an image analysis apparatus.

The electrode material 1000 is obtained by mixing the coated active material 130 and the solid electrolyte 100. The method for mixing the coated active material 130 and the solid electrolyte 100 is not particularly limited. The coated active material 130 and the solid electrolyte 100 may be mixed using a tool such as a mortar, or the coated active material 130 and the solid electrolyte 100 may be mixed using a mixer such as a ball mill.

Embodiment 3

Embodiment 3 will now be described. Explanation that overlaps with the above-described Embodiment 1 or 2 is omitted as appropriate.

Figure 5:
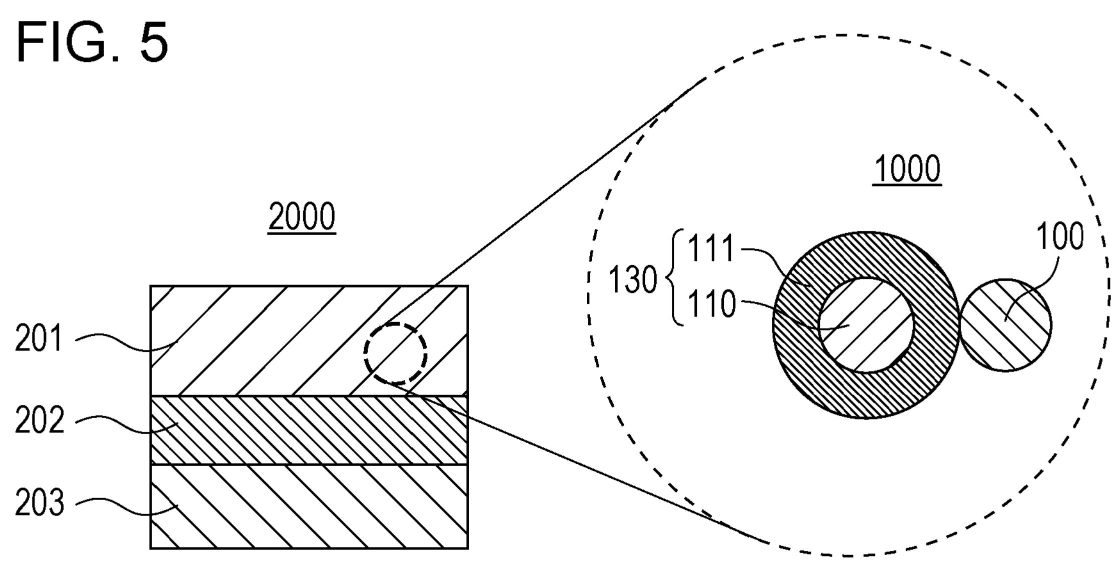
FIG. 5 is a cross-sectional view illustrating a schematic structure of a battery in Embodiment 3.

FIG. 5 is a cross-sectional view illustrating a schematic structure of a battery 2000 in Embodiment 3.

The battery 2000 in Embodiment 3 includes a positive electrode 201, an electrolyte layer 202, and a negative electrode 203.

The positive electrode 201 includes the electrode material 1000 in Embodiment 2.

The electrolyte layer 202 is disposed between the positive electrode 201 and the negative electrode 203.

According to the configuration above, the interface resistance of the battery 2000 can be reduced.

In the positive electrode 201, the ratio of the volume of the positive electrode active material and the volume of the solid electrolyte, "v1:(100−v1)", may satisfy 30≤v1≤95. When 30≤v1 is satisfied, the energy density of the battery 2000 is sufficiently secured. When v1≤95 is satisfied, high-output operation is possible. The volume of the solid electrolyte is the total volume of the solid electrolyte 100 and the coating material.

The thickness of the positive electrode 201 may be greater than or equal to 10 μm and less than or equal to 500 μm. When the thickness of the positive electrode 201 is greater than or equal to 10 μm, the energy density of the battery 2000 is sufficiently secured. When the thickness of the positive electrode 201 is less than or equal to 500 μm, high-output operation is possible.

The electrolyte layer 202 is a layer containing an electrolyte. The electrolyte is, for example, a solid electrolyte. That is, the electrolyte layer 202 may be a solid electrolyte layer.

The electrolyte layer 202 may contain at least one selected from the group consisting of a halide solid electrolyte, a sulfide solid electrolyte, an oxide solid electrolyte, a polymeric solid electrolyte, and a complex hydride solid electrolyte.

When the electrolyte layer 202 contains a halide solid electrolyte, a halide solid electrolyte having the same composition as that of the halide solid electrolyte in the coating material in Embodiment 1 may be used. According to such a configuration, the output density and charge and discharge characteristics of the battery 2000 can be more improved.

The solid electrolyte contained in the electrolyte layer 202 may be a halide solid electrolyte having a composition that is different from that of the coating material in Embodiment 1. According to such a configuration, the charge and discharge characteristics of the battery can be more improved.

When the electrolyte layer 202 contains a sulfide solid electrolyte, the materials exemplified in Embodiment 2 can be used as the sulfide solid electrolyte.

As the solid electrolyte contained in the electrolyte layer 202, the same sulfide solid electrolyte as the solid electrolyte 100 in Embodiment 2 may be used. The electrolyte layer 202 may contain a sulfide solid electrolyte having the same composition as that of the solid electrolyte 100 in Embodiment 2.

According to the configuration above, since a sulfide solid electrolyte having excellent reduction stability is included, a negative electrode material with a low potential, such as graphite or metal lithium, can be used, and the energy density of the battery 2000 can be improved. According to a configuration in which the electrolyte layer 202 has the same sulfide solid electrolyte as the solid electrolyte 100 in Embodiment 2, the charge and discharge characteristics of the battery 2000 can be improved.

When the electrolyte layer 202 contains an oxide solid electrolyte, as the oxide solid electrolyte, the materials exemplified in Embodiment 2 can be used.

When the electrolyte layer 202 contains a polymeric solid electrolyte, as the polymeric solid electrolyte, the materials exemplified in Embodiment 2 can be used.

When the electrolyte layer 202 contains a complex hydride solid electrolyte, as the complex hydride solid electrolyte, the materials exemplified in Embodiment 2 can be used.

The electrolyte layer 202 may contain a solid electrolyte as a main component. That is, the electrolyte layer 202 may contain the solid electrolyte, for example, at a mass proportion of greater than or equal to 50% with respect to the total amount of the electrolyte layer 202. According to such a configuration, the charge and discharge characteristics of the battery 2000 can be more improved.

The electrolyte layer 202 may contain the solid electrolyte at a mass proportion of greater than or equal to 70% with respect to the total amount of the electrolyte layer 202. According to such a configuration, the charge and discharge characteristics of the battery 2000 can be more improved.

The electrolyte layer 202 contains the solid electrolyte as a main component contained in the electrolyte layer 202 and may further contain inevitable impurities, the starting raw materials used when the solid electrolyte is synthesized, by-products, decomposition products, and so on.

The electrolyte layer 202 may contain the solid electrolyte at a mass proportion of 100% with respect to the total amount, except for impurities of which contamination is unavoidable, of the electrolyte layer 202.

According to the configuration above, the charge and discharge characteristics of the battery 2000 can be more improved.

As described above, the electrolyte layer 202 may be constituted of only the solid electrolyte.

The electrolyte layer 202 may contain two or more of the materials exemplified as solid electrolytes. For example, the electrolyte layer 202 may contain a halide solid electrolyte and a sulfide solid electrolyte.

The thickness of the electrolyte layer 202 may be greater than or equal to 1 μm and less than or equal to 300 μm. When the thickness of the electrolyte layer 202 is greater than or equal to 1 μm, the positive electrode 201 and the negative electrode 203 can be more certainly separated from each other. When the thickness of the electrolyte layer 202 is less than or equal to 300 μm, high-output operation can be realized.

The negative electrode 203 includes a material that has a property of occluding and releasing metal ions (e.g., lithium ions). The negative electrode 203 includes, for example, a negative electrode active material.

As the negative electrode active material, for example, a metal material, a carbon material, an oxide, a nitride, a tin compound, or a silicon compound can be used. The metal material may be a single metal or an alloy. Examples of the metal material are a lithium metal and a lithium alloy. Examples of the carbon material are natural graphite, coke, graphitizing carbon, carbon fibers, spherical carbon, artificial graphite, and amorphous carbon. From the viewpoint of the capacity density, silicon (Si), tin (Sn), a silicon compound, or a tin compound can be used.

The negative electrode 203 may include a solid electrolyte. As the solid electrolyte, the solid electrolytes exemplified as the materials constituting the electrolyte layer 202 may be used. According to the configuration above, the lithium ion conductivity in the negative electrode 203 is enhanced, and high-output operation is possible.

The median diameter of the negative electrode active material particles may be greater than or equal to 0.1 μm and less than or equal to 100 μm. When the median diameter of the negative electrode active material particles is greater than or equal to 0.1 μm, the negative electrode active material and the solid electrolyte can form a good dispersion state in the negative electrode. Consequently, the charge and discharge characteristics of the battery 2000 are improved. When the median diameter of the negative electrode active material is less than or equal to 100 μm, the lithium diffusion in the negative electrode active material becomes faster. Consequently, the battery 2000 can operate at high output.

The median diameter of the negative electrode active material particles may be larger than that of the solid electrolyte included in the negative electrode 203. Consequently, a good dispersion state of the negative electrode active material particles and the solid electrolyte particles can be formed.

The volume ratio of the negative electrode active material and the solid electrolyte, "v2:(100−v2)", may satisfy $30 \leq v2 \leq 95$. When $30 \leq v2$, a sufficient energy density of the battery 2000 can be secured. When $v2 \leq 95$, high-output operation can be realized.

The thickness of the negative electrode 203 may be greater than or equal to 10 μm and less than or equal to 500 μm. When the thickness of the negative electrode 203 is greater than or equal to 10 μm, sufficient energy density of the battery 2000 can be secured. When the thickness of the negative electrode 203 is less than or equal to 500 μm, high-output operation can be realized.

At least one selected from the group consisting of the positive electrode 201, the electrolyte layer 202, and the negative electrode 203 may include a binder for the purpose of improving the adhesion between the particles. The binder is used for improving the binding property of the material constituting the electrode. Examples of the binder include polyvinylidene fluoride, polytetrafluoroethylene, polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene-butadiene rubber, and carboxymethylcellulose. As the binder, a copolymer of two or more materials selected from the group consisting of tetrafluoroethylene, hexafluoroethylene, hexafluoropropylene, perfluoroalkyl vinyl, fluorinated vinylidene, chlorotrifluoroethylene, ethylene, propylene, pentafluoropropylene, fluoromethyl vinyl ether, acrylic acid, and hexadiene can also be used. Two or more selected from these binders may be mixed and used as the binder.

At least one selected from the group consisting of the positive electrode 201 and the negative electrode 203 may include a conductive additive for the purpose of enhancing the electron conductivity. As the conductive additive, for example, graphite such as natural graphite and artificial graphite, carbon black such as acetylene black and Ketjen black, conductive fibers such as carbon fibers and metal fibers, metal powders such as fluorinated carbon and aluminum, conductive whiskers such as zinc oxide and potassium titanate, conductive metal oxides such as titanium oxide, and conductive polymeric compounds such as polyaniline, polypyrrole, and polythiophene can be used. When the carbon conductive additive is used, the cost can be reduced.

The battery 2000 in Embodiment 3 can be configured as batteries of various shapes such as a coin type, a cylindrical type, a square type, a sheet type, a button type, a flat type, and a stacked type.

EXAMPLES

The present disclosure will now be described in detail using Examples and Reference Example.

Example 1

Production of Solid Electrolyte $Li_2S$ and $P_2S_5$ as raw material powders were weighed at a molar ratio of $Li_2S$:$P_2S_5$ of 75:25 in an argon glove box having a dew point of −60° C. or less. They were pulverized and mixed in a mortar to obtain a mixture. Subsequently, the mixture was subjected to milling treatment using a planetary ball mill (manufactured by FRITSCH GmbH, P-7 model) for 10 hours under a condition of 510 rpm. Consequently, a glassy solid electrolyte was obtained. The glassy solid electrolyte was heat-treated in an inert atmosphere under a condition of 270° C. for 2 hours. Consequently, a glass ceramic solid electrolyte, $Li_2S—P_2S_5$ (hereinafter, referred to as "LPS"), was obtained.

Production of First Coating Material

LiCl, LiBr, and $YCl_3$ as raw material powders were weighed at a molar ratio of LiCl:LiBr:$YCl_3$ of 1:2:1 in an argon glove box having a dew point of −60° C. or less. They were pulverized and mixed in a mortar to obtain a mixture. Subsequently, the mixture was subjected to milling treatment using a planetary ball mill (manufactured by FRITSCH GmbH, P-5 model) for 25 hours under a condition of 600 rpm. Consequently, a powder of a solid electrolyte represented by a formula $Li_3YiBr_2Cl_4$ (hereinafter, represented by LYBC) was obtained.

Production of Coated Active Material

In an argon glove box, 5.95 g of ethoxylithium (manufactured by Kojundo Chemical Lab. Co., Ltd.) and 36.43 g of niobium pentaethoxide (manufactured by Kojundo Chemical Lab. Co., Ltd.) were dissolved in 500 mL of super-dehydrated ethanol (manufactured by FUJIFILM Wako Pure Chemical Corporation) to produce a coating solution.

As the positive electrode active material, a powder of $Li(Ni,Co,Al)O_2$ (hereinafter, referred to as NCA) was provided. In the treatment for forming a coating layer of $LiNbO_3$ on the surface of NCA, a tumbling fluidized bed granulating-coating machine (manufactured by Powrex Corporation, FD-MP-01E) was used. The input amount of NCA, the stirring rotation speed, and the feeding rate of the coating solution were 1 kg, 400 rpm, and 6.59 g/min, respectively. The input amount of the coating solution was adjusted such that the film thickness of $LiNbO_3$ was 10 nm. The input amount of the coating solution was calculated using the specific surface area of the active material and the density of $LiNbO_3$. A series of processes using the tumbling fluidized bed granulating-coating machine was carried out in a dry atmosphere having a dew point of −30° C. or less. After the completion of the treatment for forming a coating layer of $LiNbO_3$, the obtained powder was put in an alumina crucible and was heat-treated in the atmosphere under a condition of 300° C. for 1 hour. The heat-treated powder was pulverized again in an agate mortar. Consequently, NCA provided with a second coating layer (hereinafter, referred to as "Nb-NCA") was obtained. The second coating layer was made of a second coating material, lithium niobate ($LiNbO_3$).

Subsequently, a first coating layer made of LYBC was formed on the surface of Nb-NCA. The first coating layer was formed by compression and shear treatment using a particle composing apparatus (NOB-MINI, manufactured by Hosokawa Micron Corporation). Specifically, Nb-NCA and LYBC were weighed at a mass ratio of 93.7:6.3 and were treated under conditions of a blade clearance of 2 mm, a rotation speed of 6900 rpm, and a treatment time of 25 min. Consequently, a coated active material of Example 1 was obtained.

Calculation of Supernatant NV Rate

A dispersing liquid of the coated active material was prepared by the method described above. Specifically, 0.4 g of the coated active material was dispersed in 20 g of p-chlorotoluene to prepare a dispersing liquid. The mass content ratio of the first coating material in this dispersing liquid was $(0.4\ (g)\times 6.3(\%))/(0.4\ (g)+20\ (g))\approx 0.12(\%)$.

Subsequently, the dispersing liquid was stirred with a homogenizer (manufactured by SMT Corporation, UH-50, 20 kHz) for 1 minute. Subsequently, the dispersing liquid was left to stand for 30 minutes to precipitate the coated active material. Subsequently, only the supernatant liquid was collected. The mass of the supernatant liquid was 10 g. The collected supernatant liquid was heated to volatilize the solvent under conditions of 130° C., −30 kPa, and 1.5 hours. Subsequently, the mass of the residue remaining without volatilizing was measured. The mass of the residue was 0.001 g. The NV value of the supernatant liquid was calculated based on Equation III described above. The NV value of the supernatant liquid was $100\times 0.01/0.12=8(\%)$. Subsequently, the supernatant NV rate was calculated based on Equation I described above. The results are shown in Table 1.

Production of Positive Electrode Material

The coated active material of Example 1 and a solid electrolyte (LPS) were weighed in an argon glove box such that the volume ratio of Nb-NCA and the solid electrolyte was 70:30. These materials were mixed in an agate mortar to produce a positive electrode material of Example 1. In the volume ratio of Nb-NCA and the solid electrolyte, the "solid electrolyte" means the total volume of LYBC as the first coating material and LPS.

Example 2

A coated active material and a positive electrode material of Example 2 were obtained by the same method as in Example 1 except that in the compression and shear treatment when the coated active material was produced, the rotation speed of the particle composing apparatus was changed to 5500 rpm. The supernatant NV rate was calculated by the same method as in Example 1.

Example 3

A coated active material and a positive electrode material of Example 3 were obtained by the same method as in Example 1 except that in the compression and shear treatment when the coated active material was produced, the rotation speed of the particle composing apparatus was changed to 4000 rpm. The supernatant NV rate was calculated by the same method as in Example 1.

Reference Example 1

A coated active material and a positive electrode material of Reference Example 1 were obtained by the same method as in Example 1 except that the first coating layer was formed by mixing Nb-NCA and a solid electrolyte in an agate mortar without using a particle composing apparatus. The supernatant NV rate was calculated by the same method as in Example 1.

Production of Battery

The following process was carried out using the positive electrode material, LYBC, and LPS.

In an insulating outer cylinder, 60 mg of LPS, 20 mg of LYBC, and a positive electrode material were stacked in this order. On this occasion, the positive electrode material was weighed such that the mass of the positive electrode active material was 14 mg. The obtained stack was compression molded at a pressure of 720 MPa to obtain a positive electrode and a solid electrolyte layer.

Subsequently, metal Li (thickness: 200 μm) was stacked on the solid electrolyte layer on the side opposite to the side in contact with the positive electrode. The obtained stack was compression molded at a pressure of 80 MPa to produce a stack composed of a positive electrode, a solid electrolyte layer, and a negative electrode.

Subsequently, current collectors made of stainless steel were disposed on and under the stack. A current collector lead was attached to each of the current collectors.

Finally, the insulating outer cylinder was sealed with an insulating ferrule to isolate the inside of the outer cylinder from the outside atmosphere to produce a battery.

As in above, batteries of Examples 1 to 3 and Reference Example 1 were produced.

Charging Test

A charging test was carried out using the batteries of Examples 1 to 3 and Reference Example 1 under the following conditions.

A battery was placed in a thermostat of 25° C.

The battery was charged at a constant current of 140 μA that is a current value corresponding to 0.05 C rate (20-hour rate) with respect to the theoretical capacity of the battery until the voltage reached 4.3 V. After a quiescent time of 20 minutes, the battery was discharged at a constant current of 140 μA that is a current value corresponding to 0.05 C rate (20-hour rate) until the voltage reached 3.7 V.

The frequency characteristics of the battery was measured under conditions of a frequency range of from 10 mHz to 1 MHz and a voltage magnitude of 10 mV using an impedance measurement system (Solartron Analytical, 1470E, 1255B). The value obtained by multiplying the circular arc resistance (unit: Ω) observed around 1 kHz by the mass (unit: mg) of the positive electrode active material was calculated as the interface resistance.

The results obtained above are shown in Table 1.

TABLE 1

| | Method for forming first coating layer | Supernatant NV rate | Interface resistance |
|---|---|---|---|
| Example 1 | NOBILTA (6900 rpm) | 8% | 193 Ω · mg |
| Example 2 | NOBILTA (5500 rpm) | 15% | 244 Ω · mg |
| Example 3 | NOBILTA (4000 rpm) | 16% | 269 Ω · mg |
| Reference Example 1 | mortar | 23% | 461 Ω · mg |

Consideration

As shown in Table 1, in the positive electrode material using the coated active material, the interface resistance of the battery varied according to the amount of residue of the first coating material (LYBC). Specifically, when the supernatant NV rate was 23%, the value of the interface resistance was 461 Ω·mg. The interface resistance decreased significantly as the supernatant NV rate decreased. When the supernatant NV rate was less than 23%, the value of the interface resistance was less than 461 Ω·mg. When the supernatant NV rate was 16%, the interface resistance was 269 Ω·mg. When the supernatant NV rate was 15%, the interface resistance was 244 Ω·mg. When the supernatant NV rate was 8%, the interface resistance was 193 Ω·mg. It is inferred that these effects are the result of preventing the contact between the sulfide solid electrolyte and the active material by the coating layer.

The technology of the present disclosure is useful for, for example, an all-solid-state lithium secondary battery.

What is claimed is:

1. A coated active material comprising:

an active material; and a coating layer coating at least a part of a surface of the active material, wherein the coating layer includes a first coating material, and the coated active material has a supernatant non-volatile (NV) rate of less than 23%, wherein the supernatant NV rate is a ratio of a NV value of a supernatant liquid to a mass content ratio of the first coating material in a dispersing liquid obtained by dispersing the coated active material in a solvent, and the NV value of the supernatant liquid is a ratio of a mass of a non-volatile component to a mass of the supernatant liquid obtained by precipitating the coated active material by leaving the dispersing liquid to stand.

2. The coated active material according to claim 1, wherein the active material is a positive electrode active material.

3. The coated active material according to claim 1, wherein the supernatant NV rate is less than or equal to 16%.

4. The coated active material according to claim 1, wherein the supernatant NV rate is less than or equal to 15%.

5. The coated active material according to claim 1, wherein the supernatant NV rate is less than or equal to 8%.

6. The coated active material according to claim 1, wherein the first coating material includes Li, M1, and X1, M1 is at least one selected from the group consisting of metal elements excluding Li and metalloid elements, and X1 is at least one selected from the group consisting of F, Cl, Br, and I.

7. The coated active material according to claim 6, wherein the first coating material is represented by the following Formula (1):

$$Li_{\alpha 1}M1_{\beta 1}X1_{\gamma 1} \quad (1)$$

where α1, β1, and γ1 are each independently a value greater than 0.

8. The coated active material according to claim 6, wherein

M1 includes yttrium.

9. The coated active material according to claim 1, wherein the coating layer includes a first coating layer containing the first coating material and a second coating layer containing a second coating material, and the first coating layer is located on the outer side of the second coating layer.

10. The coated active material according to claim 9, wherein the second coating material includes an oxide solid electrolyte having lithium ion conductivity.

11. The coated active material according to claim 9, wherein the second coating material includes Nb.

12. The coated active material according to claim 9, wherein the second coating material includes lithium niobate.

13. An electrode material comprising:

the coated active material according to claim 1; and a solid electrolyte.

14. The electrode material according to claim 13, wherein the solid electrolyte includes a sulfide solid electrolyte.

15. A battery comprising:

a positive electrode including the electrode material according to claim 13, a negative electrode, and an electrolyte layer disposed between the positive electrode and the negative electrode.

* * * * *